United States Patent
Asao et al.

(10) Patent No.: US 6,605,574 B2
(45) Date of Patent: Aug. 12, 2003

(54) GREASE SEALED BEARING FOR AUTOMOBILE

(75) Inventors: Mitsunari Asao, Mie (JP); Hidenobu Mikami, Mie (JP); Takayuki Kawamura, Mie (JP); Takahiro Koremoto, Shizuoka (JP); Kunio Takemura, Tokyo (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/051,753

(22) Filed: Jan. 16, 2002

(65) Prior Publication Data

US 2002/0137639 A1 Sep. 26, 2002

(30) Foreign Application Priority Data

Jan. 26, 2001 (JP) ...................... P2001-018685

(51) Int. Cl.[7] .................... C10M 105/38; C10M 115/08
(52) U.S. Cl. ................ 508/376; 508/378; 508/485; 508/552
(58) Field of Search ................ 508/552, 376

(56) References Cited

U.S. PATENT DOCUMENTS 5,043,085 A * 8/1991 Kinoshita et al. ........... 508/552
5,707,944 A * 1/1998 Yokouchi et al. ........... 508/552
6,037,314 A * 3/2000 Kondo et al. ............... 508/552
6,319,880 B1 * 11/2001 Okaniwa et al. ............ 508/552
6,403,538 B1 * 6/2002 Ozaki et al. ................ 508/552
6,432,889 B1 * 8/2002 Kinoshita et al. ........... 508/552

FOREIGN PATENT DOCUMENTS

| JP | 06-275552 | 10/1994 |
| JP | 08-014299 | 1/1996 |
| JP | 10-070482 | 3/1998 |

* cited by examiner

Primary Examiner—Ellen M. McAvoy
(74) Attorney, Agent, or Firm—Hedman & Costigan, P.C.

(57) ABSTRACT

Disclosed is a grease sealed bearing for automobile that has the high temperature resistance as well as shear stability, and prevents the noise at low temperature as well as the brittle flaking under high speed rotation and high load. The grease comprises a base oil containing a synthesized hydrocarbon oil and one or more ester oils at a weight ratio of 0.1 to 0.49:0.9 to 0.51; 5 to 30% by weight of a urea based thickener, and 0.1 to 10% by weight of dithiozinc phosphate based on the whole grease. The grease sealed bearing for automobile is obtained by sealing a bearing used in a device driven by an automobile engine with the grease.

12 Claims, 1 Drawing Sheet

GREASE SEALED BEARING FOR AUTOMOBILE

BACKGROUND OF THE INVENTION

The present invention relates to a grease sealed bearing for automobile and a grease used in a device driven by an automobile engine.

A timing belt driven by an automobile engine and a belt for driving an auxiliary machine such as an alternator (AC generator) have belt tensioners to adjust a winding angle of the belt, and to provide adequate tension to the belt. Some of the belt tensioners are in a so-called bevel outer ring type that a rolling surface of a pulley that contacts with the belt is disposed directly at an outer ring of a ball bearing. Many of the belt tensioners are an integrated type that a pulley having a rolling surface and a ball bearing are engaged. In the pulley used in the latter type belt tensioners, when the pulley is rotated by transmission torque from the belt, the outer ring of the ball bearing that is engaged with the pulley is also rotated together therewith.

A demand for lightweight automobiles is increasing these days. This demand urges that auxiliary parts of an automobile have to be compact in size and lightweight. On the other hand, such devices are required to have a high power and a high efficiency. A compact size undesirably induces an decrease in the output of the devices. To compensate the decreased output, the devices have to be rotated at high speed.

In the pulley for rotating the belt that transmits rotating power from the automobile engine, in order to prevent a reduction in the transmission efficiency caused by the compact-sized pulley, it is necessary to form the pulley with a plurality of grooves for engaging power transmission belts to keep the tension of the belts high. The bearing engaged with an inside diameter of the pulley of the belt tensioner, which has a rolling surface contacted with the belt, is therefore required to withstand high-speed rotation and high load. Generally speaking, with a grease-sealed bearing, the life of the grease is shorter than the rolling life of the bearing itself and thus the life of the bearing is determined by the life of the grease. Accordingly, it is required to seal the bearing with a grease which has a stable durability at high temperature including prolonged life under the conditions of high-speed and high load.

When the pulley of the belt tensioner is operated at low temperature, a noise such as a hoot noised may be produced depending on specifications and operating conditions of the pulley. The causes of the noise are not yet specifically clarified. While not wishing to be bound by any particular theory, it is believed that the pulley is resonated by self-induced vibration of a rolling element which is induced by irregularity and unevenness of a grease film, and the outer ring is vibrated in the axis direction (translation motion), resulting in the noise at low temperature.

Even if the grease that can prevent the noise from producing is used on the bearing, the high-speed rotation and high load can cause early brittle flaking on the rolling surface of the bearing. Unlike a flaking occurring on the rolling surface or in its superficial area owing to metal fatigue, this type of flaking indicates a peculiar destructive phenomenon which has suddenly started from a deep area in the bearing. Such flaking may occur in the following mechanism: namely, the bearing vibrates due to high-speed operation; the vibration causes wear of the rolling surface into a mirror surface; this produces a new surface, which acts as a catalyst and decomposes the grease, thus producing hydrogen; the hydrogen penetrates into the steel of the bearing, thus causing embrittlement of the steel.

Japanese Patent Laid-Open Publication Nos. 9-208982 and 11-270566 disclose a grease for use in a pulley comprising a base oil containing a synthesized hydrocarbon oil and an ester oil, and a thickener comprising a urea compound. The grease has excellent high temperature resistance, prevents the noise at low temperature, and withstands brittle flaking under high-speed rotation and high load.

Japanese Patent Laid-Open Publication No. 8-113793 discloses a grease suitable especially for an outer ring rotation comprising 10% by weight or more of an ester oil, and a thickener comprising a diurea compound terminated at their ends with aromatic hydrocarbon groups.

However, the aforementioned greases do not satisfy all of the properties including the prevention of the noise at low temperature, the high temperature resistance, and the prevention of the brittle flaking under high-speed rotation and high load. It is difficult to provide both stability of the oily film at low temperature, and durability of the grease at high temperature.

Even if these greases had excellent properties, there would give rise to a new problem that the greases have extremely increased penetration during a long period of operation under a high shearing pressure. The grease having increased penetration tends to be leaked from the bearing, which may decrease the life of the bearing.

SUMMARY OF THE INVENTION

In view of the aforementioned problems of the prior art, an object of the present invention is to provide a grease sealed bearing for automobile that has the high temperature resistance as well as shear stability, and prevents the noise at low temperature as well as the brittle flaking under high-speed rotation and high load.

One aspect of the present invention is a grease sealed bearing for automobile used in a device driven by an automobile engine, in which the grease comprises a base oil containing a synthesized hydrocarbon oil and one or more ester oils at a weight ratio of 0.1 to 0.49:0.9 to 0.51; 5 to 30% by weight of a urea based thickener, and 0.1 to 10% by weight of dithiozinc phosphate based on the whole grease.

As used herein, the term "a device driven by an automobile engine" describes a device for adjusting a tension of a timing belt, a belt for driving an auxiliary machine and the like.

According to the present invention, the ester oil has a kinetic viscosity of 30 to 100 mm$^2$/s at 40° C., and a pour point of −30° C. or less.

According to the present invention, the synthesized hydrocarbon oil has a kinetic viscosity of 3 to 65 mm$^2$/s at 40° C., and a pour point of −50° C. or less.

According to the present invention, the urea based thickener is an alicyclic urea compound.

The ester oil is used as the base oil of the grease, the urea based thickener and the dithiozinc phosphate are mixed therein at the above-mentioned ratio, specifically, the ester oil has a kinetic viscosity of 30 to 100 mm$^2$/s at 40° C., and a pour point of −30° C. or less, the synthesized hydrocarbon oil has a kinetic viscosity of 3 to 65 mm$^2$/s at 40° C., and a pour point of −50° C. or less, and the urea thickener is an alicyclic urea compound, thereby providing the grease having excellent properties at low temperature, while maintaining excellent heat resistance attributed to the ester oil. The use of the alicyclic urea compound provides excellent shear stability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
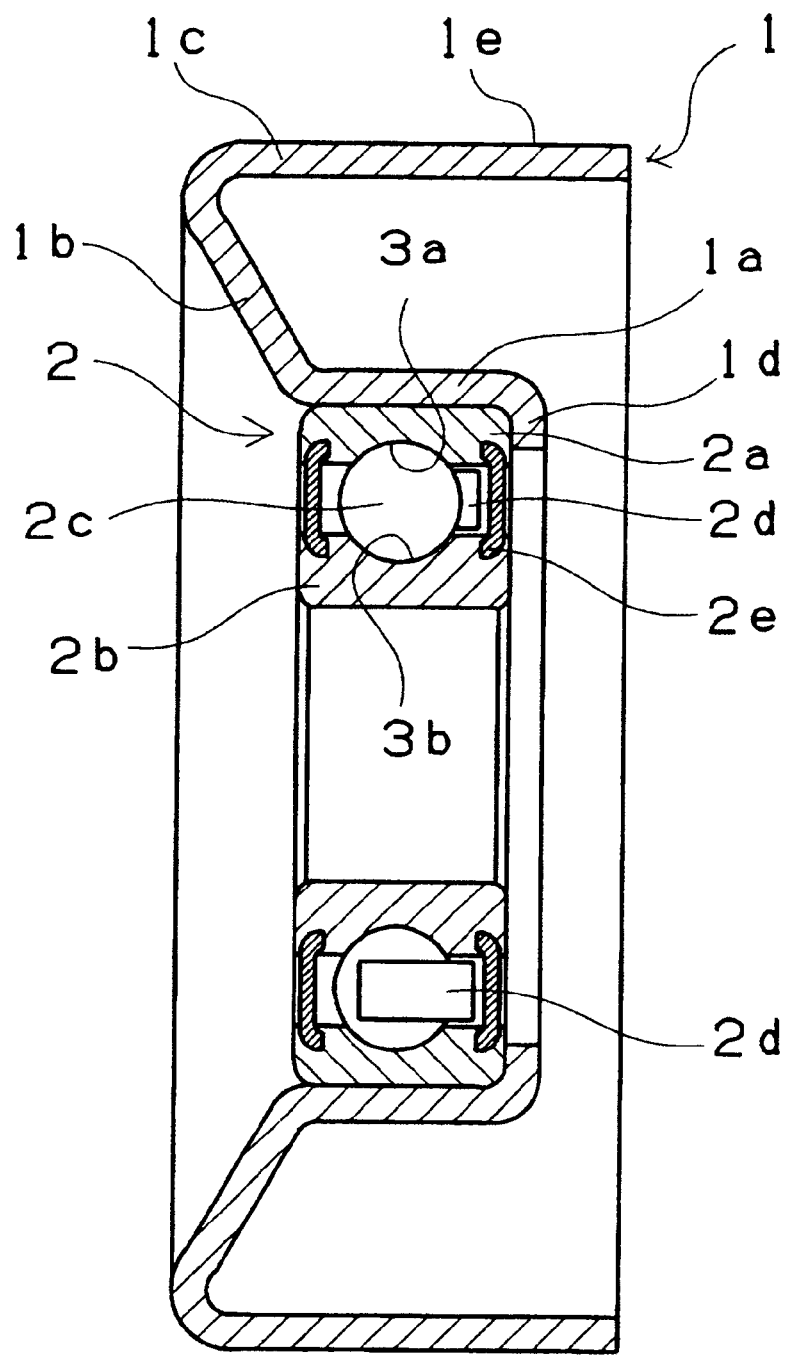
FIG. 1 is a sectional view of an embodiment of an idler pulley.

Referring to FIG. 1, the grease sealed bearing for automobile according to the present invention will be described. FIG. 1 shows a sectional view of one embodiment of an idler pulley used as a belt tensioner of a belt for driving an auxiliary machine in an automobile.

The pulley comprises a pulley body 1 made of steel plate press, and a single row deep groove ball bearing 2 that is fitted into an inside diameter of the pulley body 1. The pulley body 1 is in a ring shape including an inside diameter cylinder 1a, a flange 1b extending from an end of the inside diameter cylinder 1a to an outside diameter side, an outside diameter cylinder 1c extending from the flange 1b to an axis direction, and a brim 1d extending from another end of the inside diameter cylinder 1a to an inside diameter side. An outer ring 2a of a ball bearing 2 is fitted into the inside diameter cylinder 1a, and a rolling surface 1e that contacts with the belt driven by the engine is formed on the outside diameter cylinder 1c. The rolling surface 1e is contacted with the belt, whereby the pulley functions as the idler.

The ball bearing 2 comprises the outer ring 2a fitted into the inside diameter cylinder 1a, an inner ring 2b fitted into a fixed axis (not shown), a plurality of balls 2c built between raceway surfaces 3b, 3a of the inner and outer rings 2b, 2a, a cage 2d for holding balls 2c at regular intervals on circumference, and a pair of seals 2e for sealing a grease. The outer ring 2a and the inner ring 2b are formed integrally.

The grease that is sealed inside of the ball bearing 2 will be described.

The grease comprises a base oil containing an ester oil. The ester oil is preferably a polyol ester oil having three or four ester groups in the molecule. Especially preferred is an ester where a β-carbon at a polyhydric alcohol side is quaternary such as trimethylolpropane ester represented by the following formula 1, and pentaerythritol ester represented by the following formula 2. In the formulae, each of $R_1$, $R_2$, and $R_3$ represents an alkyl group. Each alkyl group may have any number of carbon atoms as long as the ester oil has the predetermined kinetic viscosity described later.

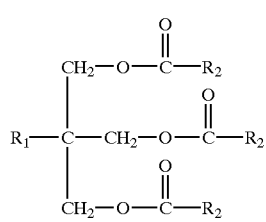
(1)

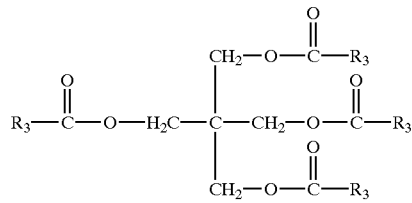
(2)

The above-mentioned ester oil has a kinetic viscosity of 30 to 100 mm²/s at 40° C., and a pour point of −30° C. or less. If the kinetic viscosity of the ester oil exceeds 100 mm²/s, viscosity is increased at low temperature, resulting in poor low temperature properties. On the other hand, if the kinetic viscosity is less than 30 mm²/s, an oily film is thinned at high temperature, resulting in poor heat resistance. If the pour point of the ester oil exceeds −30° C., low temperature properties are decreased.

The grease further comprises a synthesized hydrocarbon oil. The synthesized hydrocarbon oil is a hydrocarbon compound made of carbon and hydrogen. Examples include aliphatic hydrocarbon oils such as poly-α-olefin oil, a copolymer of α-olefin and an olefin, and polybutene; and aromatic hydrocarbon oils such as alkylbenzene, alkyl naphthalene, polyphenyl, and synthesized naphthene.

It is preferable that the aliphatic hydrocarbon oil be used as the synthesized hydrocarbon oil for use in the present invention. When the aliphatic hydrocarbon oil is mixed with the urea based thickener and dithiophosphate, there can be provided both stability of the oily film at low temperature and durability at high temperature. Especially preferred are poly-α-olefin oil, a copolymer of α-olefin and an olefin, and polybutene.

The α-olefin is an oligomer, i.e., low molecular weight polymer, in which a hydrogen is added to a terminated double bond, and is, for example, represented by the following formula 3, where n is selected so that the synthesized hydrocarbon oil has the predetermined kinetic viscosity described later. A polybutene which is a kind of poly-α-olefin can be used, and can be prepared by polymerizing a starting material containing isobutylene as a main component using a catalyst such as aluminum chloride. The polybutene may be used as is, or may be hydrogenated.

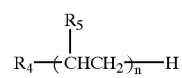
(3)

The synthesized hydrocarbon oil has a kinetic viscosity of 3 to 65 mm²/s at 40° C., and a pour point of −50° C. or less. If the kinetic viscosity of the synthesized hydrocarbon oil exceeds 65 mm²/s, the low temperature properties are decreased. On the other hand, if the kinetic viscosity is less than 3 mm²/s, an oily film is thinned. If the pour point of the synthetic hydrocarbon oil exceeds −50° C., low temperature properties are decreased.

The base oil is obtained by combining the synthesized hydrocarbon oil and at least one of the ester oil at the weight ratio of 0.1 to 0.49:0.9 to 0.51. The ester oil is used as a main component, and the synthesized hydrocarbon oil is added thereto at the above-described weight ratio, whereby there are provided both the stability in the oily film at low temperature and the durability at high temperature, and an increase in penetration under a high shear pressure can be advantageously prevented.

The urea based thickener comprises a urea compound represented by the following formula 4:

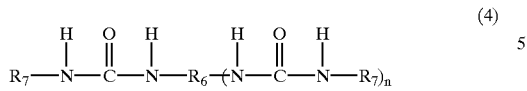

(4)

where $R_6$ is a group containing an aromatic hydrocarbon, $R_7$ is at least one hydrocarbon group selected from the group consisting of an alicyclic hydrocarbon having 6 to 12 carbon atoms and an aliphatic hydrocarbon having 6 to 20 carbon atoms, and n is 1 or 2.

The $R_6$ is a di- or tri-valent group containing an aromatic hydrocarbon, and includes an aromatic single ring, an aromatic condensed ring. These rings may be connected with a methylene chain, a cyanuric ring, or an isocyanuric ring. Specific examples include the residue of diphenylmethanediisocyanate, tolylenediisocyanate, a dimer, or trimer of these diisocyanates in which each isocyanate group is eliminated. Since the $R_6$ is a group containing the aromatic hydrocarbon, the grease has improved heat resistance.

The $R_7$ is an alicyclic hydrocarbon group having 6 to 12 carbon atoms, an aliphatic hydrocarbon group having 6 to 20 carbon atoms, or the mixture thereof. If the $R_7$ contains carbon atoms less than the above-defined range, the grease has poor thickening properties. On the other hand, if the $R_7$ contains carbon atoms exceeding the above-defined range, the heat resistance is decreased.

According to the present invention, the $R_7$ is preferably the alicyclic hydrocarbon group having 6 to 12 carbon atoms, especially preferably a cyclohexyl group. The use of the alicyclic urea compound can advantageously prevent the penetration from increasing under high shear pressure.

In the formula 4, n is 1 or 2 for keeping thermal stability of the grease.

The urea compound can be obtained by reacting an isocyanate compound with an amino compound. It is preferable that approximately equivalent weight of isocyanate group and an amino group be mixed not to leave an reactive free radical.

The grease may be obtained by reacting the isocyanate compound with the amino compound in the base oil, or by mixing the urea compound that is synthesized in advance with the base oil. Since the stability of the grease is maintained easily, the former is a preferred production method.

The urea based thickener is mixed in the amount of 5 to 30% by weight based on the whole grease. If the amount of the urea thickener is less than 5% by weight, the grease becomes liquid with low viscosity, tends to be leaked, and is difficult to seal the bearing. On the other hand, if the amount exceeds 30% by weight, the grease is solidified to have penetration of 200 or less, and cannot be applicable to seal the bearing.

The dithiozinc phosphate for use in the present invention is an aromatic metal compound represented by the following formula 5, and is a kind of an extreme-pressure additive.

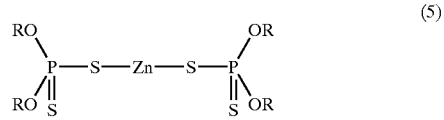

(5)

where each R is an alkyl group containing 1 to 14 carbon atoms.

The dithiozinc phosphate is mixed in the amount of 0.1 to 10% by weight based on the whole grease. If the amount of the dithiozinc phosphate is less than 0.1% by weight, there is no effect of the extreme-pressure additive. On the other hand, the amount exceeds 10% by weight, the grease is softened.

The grease for use in the present invention may further contain any known additives in order to enhance excellent properties, as required. Examples includes an antioxidant such as amine based, phenol based or sulfur based antioxidant; a rust-preventive agent such as petroleum sulfonate, dinonylnaphthalene sulfonate, sorbitan ester; a metal deactivator such as benzotriazole, and sodium nitrite; and a viscosity index improver such as polymethacrylate, and polystyrene. These additives may be used alone or in combination.

EXAMPLE 1 AND EXAMPLE 2

As the synthesized hydrocarbon oil, an α-olefin oligomer having a kinetic viscosity of 26 mm²/s at 40° C. was used. As the ester oil A, pentaerythritol ester having a kinetic viscosity of 70 mm²/s at 40° C. and a pour point of −45° C. was used, and as the ester oil B, pentaerythritol ester having a kinetic viscosity of 41.2 mm²/s at 40° C. and a pour point of −40° C. was used. These oils were mixed together in the ratios shown in Table 1 to prepare each oil. 4,4'-diphenylmethanediisocyanate was dissolved in a first half portion of each base oil. Cyclohexylamine having isocyanate equivalent was dissolved in the second half portion of each base oil. Then, the second half portion was added to the first half portion while stirred for 30 minutes at 160° C. to 170° C. to precipitate the alicyclic diurea compound so that it was contained in the base oil in the ratio shown in Table 1. After cooling, dithiozinc phosphate (ZnDTP) was added in the ratio shown in Table 1 to the mixture and stirred further. The mixture was then homogenized by use of a mixer to provide a grease.

The resultant grease was tested as follows. The test results are shown in Table 1.

TABLE 1

| | Example | | Comparative Example | | | | |
| --- | --- | --- | --- | --- | --- | --- | --- |
| | 1 | 2 | 1 | 2 | 3 | 4 | 5 |
| Base oil, weight ratio | | | | | | | |
| Synthesized hydrocarbon oil | 0.3 | 0.24 | 1 | 0.8 | 0.8 | 0.7 | 0 |
| Ester oil A | 0.7 | 0.56 | 0 | 0.2 | 0.2 | 0.3 | 1 |
| Ester oil B | — | 0.2 | — | — | — | — | — |
| Grease composition, wt % | | | | | | | |

TABLE 1-continued

|  | Example | | Comparative Example | | | | |
| --- | --- | --- | --- | --- | --- | --- | --- |
|  | 1 | 2 | 1 | 2 | 3 | 4 | 5 |
| Base oil | 80 | 80 | 80 | 83 | 82 | 88 | 80 |
| Alicyclic diurea | 19 | 19 | 20 | — | 17 | — | 20 |
| Aliphatic diurea | — | — | — | — | — | 12 | — |
| Mixed diurea | — | — | — | 17 | — | — | — |
| ZnDTP | 1 | 1 | — | — | — | — | — |
| ZnDTC | — | — | — | — | 1 | — | — |
| Properties |  |  |  |  |  |  |  |
| Consistency | 275 | 283 | 285 | 245 | 272 | 243 | 266 |
| Dropping point, ° C. | 260 or more | 260 or more | 260 or more | 260 or more | 260 or more | 252 | 260 or more |
| Noise at low temp. *1 | 0/100 | 3/100 | 100/100 | 53/100 | 0/100 | 14/100 | 0/100 |
| Durability at high temp., H | 355 | 995 | 130 | 282 | 227 | 299 | 187 |
| Flaking, H | 300 or more | 300 or more | — | 94 | 280 | 250 | 50 |
| Shear stability, *2 | 25 | 35 | — | 160 | — | 150 | — |

Note)
*1: the number of the bearings that produced the abnormal sound/the number of the bearings tested
*2: a difference in consistency (1) Penetration: measured under JIS K2220 5.3
(2) Dropping Point: measured under JIS K 2220 5.4.
(3) Noise at Low Temperature A bearing "6203" with a gap 0.02 mm or without a gap was filled with 0.85 to 0.95 g of each grease obtained in Examples. A rubber contact seal was attached to both sides of the bearing. The bearing was incorporated into the pulley as shown in FIG. 1, sufficiently cooled in a low temperature bath set to −27° C., and attached to a bearing rotating machine set to room temperature. A bearing test temperature was approximately −20° C. The pulley was rotated at 2700 rpm under a radial load of 127 N to check a production of a noise at low temperature acoustically. The results are shown in Table 1 at a ratio of the number of the bearings that produced the noise to the number of the bearings tested.

(4) Durability test at high temperature

The bearing "6204" was filled with 1.79 to 1.81 g of each grease obtained in Examples. The bearing was attached to a side of a non-contact seal bearing made of iron. An inner ring of the bearing was rotated at 10000 rpm under a radial load of 67 N and a thrust load of 67 N at 180° C. The grease was deteriorated as time elapsed, and was leaked outside of the bearing, which caused excessive turning torque. A life of the grease was determined until an input current of a motor for driving a main shaft exceeded a predetermined controlled current. The results are shown in Table 1.

(5) Flaking test

The bearing "6203" with a gap 0.02 mm or without a gap was filled with 0.85 to 0.95 g of each grease obtained in Examples. A rubber contact seal is attached to both sides of the bearing. The bearing was incorporated into the pulley as shown in FIG. 1. The pulley was applied a radial load of 2160N, and operated at 0 to 8700 rpm for 1 second and 8700 rpm for 1 second alternatively. A time was measured until a flaking was produced on a rolling surface of the bearing, and vibration was induced. The results are shown in Table 1.

(6) Shear stability test

The bearing "6203" was filled with 1 g of each grease obtained in Examples. A rubber contact seal is attached to both sides of the bearing. The bearing was incorporated into the pulley as shown in FIG. 1. The pulley was applied a radial load of 670 N, and operated at room temperature with an outer ring rotating speed of 4920 rpm. The penetration of the grease was measured before operation, and after 100 hours operation. A difference of values in penetration was calculated by subtracting a value of the penetration before operation from a value of the penetration after 100 hours operation. The more the difference is, the less the shear stability is. The results are shown in Table 1.

Comparative Examples 1 to 5

Each base oil was prepared by mixing oils in the ratios shown in Table 1. 4, 4'-diphenylmethanediisocyanate was dissolved in a first half portion of each base oil. Isocyanate equivalent of stearyl amine (aliphatic amine), cyclohexylamine (alicyclic amine), or a mixed amine was dissolved in the second half portion of each base oil at a mixing ratio shown in Table 1. Then, the second half portion was added to the first half portion while stirring the mixture. The mixture was stirred for 30 minutes at 160° C. to 170° C. to precipitate the diurea compound so that it was contained in the base oil in the ratio shown in Table 1. In Comparative Example 2, stearyl amine and cyclohexyl amine was in a ratio of 50/50 based on amine equivalence. After cooling, the mixture was then homogenized by use of a mixer to provide a grease. In Comparative Example 3, dithiozinc carbamate (ZnDTC) was added.

The resultant grease was tested as described above. The test results are shown in Table 1.

As will be apparent from the test results shown in Table 1, in Examples 1 and 2, the noise at low temperature was less produced, the durability at high temperature and the flaking properties were excellent, the difference in penetration was small, and therefore excellent shear stability was obtained.

In sharp contrast, in Comparative Examples 1, 2 and 4, the noise at low temperature was produced. In Comparative Examples 3 and 5, the flaking properties were poor, although no noise at low temperature was produced. In Comparative Examples 2 and 4, the difference in penetration was big, and therefore the shear stability was poor.

The grease sealed bearing for automobile according to the present invention prevents the production of the noise at low temperature, has the high temperature resistance and the excellent brittle flaking properties under high speed rotation and high load as well as the excellent shear stability. The grease for sealing the bearing has a small difference in penetration, and therefore has excellent shear stability.

What is claimed is:
1. A grease sealed bearing for automobile used in a device driven by an automobile engine, in which the grease com- prises a base oil containing a synthesized hydrocarbon oil and one or more ester oils at a weight ratio of 0.1 to 0.49:0.9 to 0.51; 5 to 30% by weight of a urea based thickener, and 0.1 to 10% by weight of dithiozinc phosphate based on the whole grease, wherein the synthesized hydrocarbon oil has kinetic viscosity of 3 to 65 mm$^2$/s at 40° C., and a pour of −50° C. or less, wherein the ester oil has a kinetic viscosity of 30 to 100 mm$^2$/s at 40° C., and a pour point of −30° C. or less, wherein the urea based thickener is an alicyclic urea compound.

2. A grease sealed bearing as claimed in claim 1, wherein the ester oil has a kinetic viscosity of 30 to 100 mm$^2$/s at 40° C., and a pour point of −30° C. or less.

3. A grease sealed bearing as claimed in claim 1, wherein the synthesized hydrocarbon oil has a kinetic viscosity of 3 to 65 mm$^2$/s at 40° C., and a pour point of −50° C. or less.

4. A grease sealed bearing as claimed in claim 1, wherein the device driven by an automobile engine is an idler pulley used as a belt tensioner.

5. A grease for sealing a bearing used in a device driven by an automobile engine, comprising a base oil containing a synthesized hydrocarbon oil and one or more ester oils at a weight ratio of 0.1 to 0.49:0.9 to 0.51; 5 to 30% by weight of a urea based thickener, and 0.1 to 10% by weight of dithiozinc phosphate based on the whole grease, wherein the synthesized hydrocarbon oil is an aliphatic hydrocarbon oil and has a kinetic viscosity of 3 to 65 mm$^2$/s at 40° C., and a pour point of −50° C. or less, wherein the ester oil has a kinetic viscosity of 30 to 100 mm$^2$/s at 40° C., and a pour point of −30° C. or less, wherein urea based thickener is an alicyclic urea compound.

6. A grease as claimed in claim 5, wherein the aliphatic hydrocarbon is at least one oil selected from the group consisting of poly-α-olefin oil, a copolymer of α-olefin and olefin, and polybutene.

7. A grease as claimed in claim 5, wherein the ester oil is a polyol ester oil having three or four ester groups in the molecular.

8. A grease as claimed in claim 7, wherein the polyol ester oil is trimethylolpropane ester or pentaerythritol ester.

9. A grease as claimed in claim 5, wherein the alicyclic urea compound is represented by the following formula:

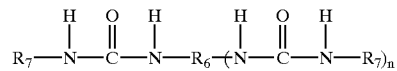

where $R_6$ is a di- or tri-valent group containing an aromatic hydrocarbon, $R_7$ is an alicyclic hydrocarbon group containing 6 to 12 carbon atoms, and n is 1 or 2.

10. A grease as claimed in claim 9, wherein $R_7$ is a cyclohexyl group.

11. A grease as claimed in claim 5, wherein the dithiozinc phosphate represented by the following formula:

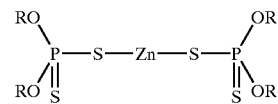

where each R is an alkyl group.

12. A grease sealed bearing for automobile used in a device driven by an automobile engine, in which the grease consists essentially of a base oil containing a synthesized hydrocarbon oil and one or more ester oils at a weigh ratio of 0.1 to 0.49:0.9 to 0.51; 5 to 30% by weight of a urea based thickener, and 0.1 to 10% by weight of dithiozinc phosphate based on the whole grease, wherein the synthesized hydrocarbon oil has a kinetic viscosity of 3 to 65 mm$^2$/s at 40° C., and a pour point of −50° C. or less, wherein the ester oil has a kinetic viscosity of 30 to 100 mm$^2$/s at 40° C., and a pour point of −30° C. or less, wherein the urea based thickener is an alicyclic urea compound.

* * * * *